United States Patent
Bushey et al.

(10) Patent No.: US 8,751,232 B2
(45) Date of Patent: *Jun. 10, 2014

(54) SYSTEM AND METHOD FOR TARGETED TUNING OF A SPEECH RECOGNITION SYSTEM

(71) Applicant: AT&T Intellectual Property I, L.P., Atlanta, GA (US)

(72) Inventors: Robert R. Bushey, Cedar Park, TX (US); Benjamin Anthony Knott, Round Rock, TX (US); John Mills Martin, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,897

(22) Filed: Feb. 6, 2013

(65) Prior Publication Data

US 2013/0151253 A1 Jun. 13, 2013

Related U.S. Application Data

(63) Continuation of application No. 12/503,586, filed on Jul. 15, 2009, now Pat. No. 8,401,851, which is a continuation of application No. 10/917,233, filed on Aug. 12, 2004, now Pat. No. 7,580,837.

(51) Int. Cl.
*G10L 15/06* (2013.01)
*G06F 17/27* (2006.01)
*G10L 15/04* (2013.01)
*G10L 15/18* (2013.01)

(52) U.S. Cl.
USPC ............. 704/244; 704/9; 704/251; 704/257; 704/270

(58) Field of Classification Search
None
See application file for complete search history.

(56) References Cited

U.S. PATENT DOCUMENTS

| | | |
|---|---|---|
| 3,811,012 A | 5/1974 | Barber |
| 4,376,874 A | 3/1983 | Karban et al. |
| 4,555,594 A | 11/1985 | Friedes et al. |
| 4,565,903 A | 1/1986 | Riley |
| 4,577,066 A | 3/1986 | Bimonte et al. |
| 4,618,984 A | 10/1986 | Das et al. |
| 4,677,569 A | 6/1987 | Nakano et al. |
| 4,688,195 A | 8/1987 | Thompson et al. |
| 4,696,028 A | 9/1987 | Morganstein et al. |
| 4,760,593 A | 7/1988 | Shapiro et al. |

(Continued)

FOREIGN PATENT DOCUMENTS

| | | |
|---|---|---|
| EP | 0424015 A2 | 4/1991 |
| EP | 0424015 A3 | 4/1991 |

(Continued)

OTHER PUBLICATIONS

"Final Office Action for U.S. Appl. No. 10/917,233", United States Patent and Trademark Office (USPTO), mail date Jul. 16, 2008, 23 pages.

(Continued)

*Primary Examiner* — Brian Albertalli
(74) *Attorney, Agent, or Firm* — Toler Law Group, PC

(57) ABSTRACT

A system and method of targeted tuning of a speech recognition system are disclosed. A particular method includes detecting that a frequency of occurrence of a particular type of utterance satisfies a threshold. The method further includes tuning a speech recognition system with respect to the particular type of utterance.

20 Claims, 3 Drawing Sheets

(56) References Cited

U.S. PATENT DOCUMENTS

| | | |
|---|---|---|
| 4,788,715 A | 11/1988 | Lee |
| 4,829,575 A | 5/1989 | Porter |
| 4,922,221 A | 5/1990 | Sato et al. |
| 4,935,927 A | 6/1990 | Kaewell, Jr. et al. |
| 4,953,204 A | 8/1990 | Cuschelg, Jr. et al. |
| 4,962,535 A | 10/1990 | Kimura et al. |
| 4,964,077 A | 10/1990 | Eisen et al. |
| 4,967,405 A | 10/1990 | Upp et al. |
| 4,975,841 A | 12/1990 | Kehnemuyi et al. |
| 4,989,230 A | 1/1991 | Gillig et al. |
| 5,042,006 A | 8/1991 | Flohrer |
| 5,043,718 A | 8/1991 | Shimura |
| 5,049,874 A | 9/1991 | Ishida et al. |
| 5,093,659 A | 3/1992 | Yamada |
| 5,113,430 A | 5/1992 | Richardson, Jr. et al. |
| 5,125,024 A | 6/1992 | Gokcen et al. |
| 5,127,042 A | 6/1992 | Gillig et al. |
| 5,142,695 A | 8/1992 | Roberts et al. |
| 5,155,759 A | 10/1992 | Saegusa et al. |
| 5,187,735 A | 2/1993 | Herrero Garcia et al. |
| 5,206,899 A | 4/1993 | Gupta et al. |
| 5,218,716 A | 6/1993 | Comroe et al. |
| 5,229,701 A | 7/1993 | Leman et al. |
| 5,231,670 A | 7/1993 | Goldhor et al. |
| 5,235,679 A | 8/1993 | Yoshizawa et al. |
| 5,241,678 A | 8/1993 | Futamura et al. |
| 5,247,564 A | 9/1993 | Zicker |
| 5,247,567 A | 9/1993 | Hirano |
| 5,260,988 A | 11/1993 | Schellinger et al. |
| 5,297,183 A | 3/1994 | Bareis et al. |
| 5,299,260 A | 3/1994 | Shaio |
| 5,309,509 A | 5/1994 | Cocklin et al. |
| 5,309,513 A | 5/1994 | Rose |
| 5,311,574 A | 5/1994 | Livanos |
| 5,335,269 A | 8/1994 | Steinlicht |
| 5,353,331 A | 10/1994 | Emery et al. |
| 5,357,564 A | 10/1994 | Gupta et al. |
| 5,367,558 A | 11/1994 | Gillig et al. |
| 5,373,161 A | 12/1994 | Tararine et al. |
| 5,415,416 A | 5/1995 | Scagnelli et al. |
| 5,416,830 A | 5/1995 | MacMillan, Jr. et al. |
| 5,432,845 A | 7/1995 | Burd et al. |
| 5,442,680 A | 8/1995 | Schellinger et al. |
| 5,455,903 A | 10/1995 | Jolissaint et al. |
| 5,469,496 A | 11/1995 | Emery et al. |
| 5,473,677 A | 12/1995 | D'Amato et al. |
| 5,497,373 A | 3/1996 | Hulen et al. |
| 5,509,055 A | 4/1996 | Ehrlich et al. |
| 5,515,366 A | 5/1996 | Chieu et al. |
| 5,521,965 A | 5/1996 | D'Alessio et al. |
| 5,522,046 A | 5/1996 | McMillen et al. |
| 5,530,744 A | 6/1996 | Charalambous et al. |
| 5,530,848 A | 6/1996 | Gilbert et al. |
| 5,546,542 A | 8/1996 | Cosares et al. |
| 5,550,895 A | 8/1996 | Burson et al. |
| 5,553,117 A | 9/1996 | Peterson et al. |
| 5,555,299 A | 9/1996 | Maloney et al. |
| 5,557,518 A | 9/1996 | Rosen |
| 5,559,860 A | 9/1996 | Mizikovsky |
| 5,590,186 A | 12/1996 | Liao et al. |
| 5,594,791 A | 1/1997 | Szlam et al. |
| 5,598,460 A | 1/1997 | Tendler |
| 5,621,789 A | 4/1997 | McCalmont et al. |
| 5,627,971 A | 5/1997 | Miernik |
| 5,630,121 A | 5/1997 | Braden-Harder et al. |
| 5,632,002 A | 5/1997 | Hashimoto et al. |
| 5,636,243 A | 6/1997 | Tanaka |
| 5,644,620 A | 7/1997 | Shimura |
| 5,652,789 A | 7/1997 | Miner et al. |
| 5,657,383 A | 8/1997 | Gerber et al. |
| 5,659,599 A | 8/1997 | Arumainayagam et al. |
| 5,673,308 A | 9/1997 | Akhavan |
| 5,675,707 A | 10/1997 | Gorin et al. |
| 5,675,817 A | 10/1997 | Moughanni et al. |
| 5,729,600 A | 3/1998 | Blaha et al. |
| 5,732,133 A | 3/1998 | Mark |
| 5,732,395 A | 3/1998 | Alexander Silverman |
| 5,735,703 A | 4/1998 | Ballard |
| 5,737,703 A | 4/1998 | Byrne |
| 5,737,723 A | 4/1998 | Riley et al. |
| 5,745,850 A | 4/1998 | Aldermeshian et al. |
| 5,748,147 A | 5/1998 | Bickley et al. |
| 5,754,639 A | 5/1998 | Flockhart et al. |
| 5,754,978 A | 5/1998 | Perez-Mendez et al. |
| 5,761,432 A | 6/1998 | Bergholm et al. |
| 5,787,360 A | 7/1998 | Johnston et al. |
| 5,794,001 A | 8/1998 | Malone et al. |
| 5,797,723 A | 8/1998 | Frost et al. |
| 5,799,279 A | 8/1998 | Gould et al. |
| 5,809,269 A | 9/1998 | Favot et al. |
| 5,828,735 A | 10/1998 | Farfan |
| 5,842,112 A | 11/1998 | Fuller et al. |
| 5,845,062 A | 12/1998 | Branton, Jr. et al. |
| 5,867,495 A | 2/1999 | Elliott et al. |
| 5,867,562 A | 2/1999 | Scherer |
| 5,867,817 A | 2/1999 | Catallo et al. |
| 5,884,262 A | 3/1999 | Wise et al. |
| 5,900,608 A | 5/1999 | Iida |
| 5,905,793 A | 5/1999 | Flockhart et al. |
| 5,909,439 A | 6/1999 | Kuwabara et al. |
| 5,917,903 A | 6/1999 | Jolissaint |
| 5,918,213 A | 6/1999 | Bernard et al. |
| 5,923,646 A | 7/1999 | Mandhyan |
| 5,923,744 A | 7/1999 | Cheng |
| 5,923,745 A | 7/1999 | Hurd |
| 5,930,337 A | 7/1999 | Mohler |
| 5,937,051 A | 8/1999 | Hurd |
| 5,940,476 A | 8/1999 | Morganstein |
| 5,946,377 A | 8/1999 | Wolf |
| 5,946,388 A | 8/1999 | Walker et al. |
| 5,950,133 A | 9/1999 | Bledsoe |
| 5,953,704 A | 9/1999 | McIlroy et al. |
| 5,960,384 A | 9/1999 | Brash |
| 5,974,127 A | 10/1999 | Wernli et al. |
| 5,978,463 A | 11/1999 | Jurkevics et al. |
| 5,987,116 A | 11/1999 | Petrunka et al. |
| 5,991,756 A | 11/1999 | Wu |
| 5,995,839 A | 11/1999 | Coursey et al. |
| 5,995,979 A | 11/1999 | Cochran |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,014,439 A | 1/2000 | Walker et al. |
| 6,016,336 A | 1/2000 | Hanson |
| 6,028,601 A | 2/2000 | Machiraju et al. |
| 6,038,293 A | 3/2000 | McNerney et al. |
| 6,038,305 A | 3/2000 | McAllister et al. |
| 6,041,229 A | 3/2000 | Turner |
| 6,044,146 A | 3/2000 | Gisby et al. |
| 6,049,594 A | 4/2000 | Furman et al. |
| 6,061,335 A | 5/2000 | De Vito et al. |
| 6,061,433 A | 5/2000 | Polcyn et al. |
| 6,064,731 A | 5/2000 | Flockhart et al. |
| 6,067,357 A | 5/2000 | Kishinsky et al. |
| 6,069,588 A | 5/2000 | O'Neill, Jr. |
| 6,070,142 A | 5/2000 | McDonough et al. |
| 6,073,031 A | 6/2000 | Helstab et al. |
| 6,085,169 A | 7/2000 | Walker et al. |
| 6,085,176 A | 7/2000 | Woolston |
| 6,088,431 A | 7/2000 | LaDue |
| 6,091,949 A | 7/2000 | Sanchez |
| 6,100,885 A | 8/2000 | Donnelly et al. |
| 6,104,798 A | 8/2000 | Lickiss et al. |
| 6,118,796 A | 9/2000 | Best et al. |
| 6,118,866 A | 9/2000 | Shtivelman |
| 6,119,101 A | 9/2000 | Peckover |
| 6,130,938 A | 10/2000 | Erb |
| 6,130,942 A | 10/2000 | Stenlund |
| 6,141,653 A | 10/2000 | Conklin et al. |
| 6,144,938 A | 11/2000 | Surace et al. |
| RE37,001 E | 12/2000 | Morganstein et al. |
| 6,157,655 A | 12/2000 | Shtivelman |
| 6,173,042 B1 | 1/2001 | Wu |

(56) References Cited

U.S. PATENT DOCUMENTS

| | | |
|---|---|---|
| 6,173,266 B1 | 1/2001 | Marx et al. |
| 6,173,289 B1 | 1/2001 | Sonderegger et al. |
| 6,173,399 B1 | 1/2001 | Gilbrech |
| 6,175,621 B1 | 1/2001 | Begeja et al. |
| 6,181,776 B1 | 1/2001 | Crossley et al. |
| 6,182,052 B1 | 1/2001 | Fulton et al. |
| 6,185,427 B1 | 2/2001 | Krasner et al. |
| 6,188,888 B1 | 2/2001 | Bartle et al. |
| 6,192,398 B1 | 2/2001 | Hunt |
| 6,201,950 B1 | 3/2001 | Fuller et al. |
| 6,202,051 B1 | 3/2001 | Woolston |
| 6,208,854 B1 | 3/2001 | Roberts et al. |
| 6,219,805 B1 | 4/2001 | Jones et al. |
| 6,233,313 B1 | 5/2001 | Farris et al. |
| 6,233,546 B1 | 5/2001 | Datig |
| 6,240,181 B1 | 5/2001 | Tunstall |
| 6,240,297 B1 | 5/2001 | Jadoul |
| 6,246,986 B1 | 6/2001 | Ammicht et al. |
| 6,259,786 B1 | 7/2001 | Gisby |
| 6,260,014 B1 | 7/2001 | Bahl et al. |
| 6,263,071 B1 | 7/2001 | Swan et al. |
| 6,269,153 B1 | 7/2001 | Carpenter et al. |
| 6,269,336 B1 | 7/2001 | Ladd et al. |
| 6,295,432 B1 | 9/2001 | Inoue et al. |
| 6,301,350 B1 | 10/2001 | Henningson et al. |
| 6,314,402 B1 | 11/2001 | Monaco et al. |
| 6,317,439 B1 | 11/2001 | Cardona et al. |
| 6,317,884 B1 | 11/2001 | Eames et al. |
| 6,320,534 B1 | 11/2001 | Goss |
| 6,320,951 B1 | 11/2001 | Shtivelman et al. |
| 6,327,343 B1 | 12/2001 | Epstein et al. |
| 6,327,350 B1 | 12/2001 | Spangler et al. |
| 6,332,082 B1 | 12/2001 | Fuller et al. |
| 6,333,980 B1 | 12/2001 | Hollatz et al. |
| 6,334,127 B1 | 12/2001 | Bieganski et al. |
| 6,353,608 B1 | 3/2002 | Cullers et al. |
| 6,356,936 B1 | 3/2002 | Donoho et al. |
| 6,362,778 B2 | 3/2002 | Neher |
| 6,366,658 B1 | 4/2002 | Bjornberg et al. |
| 6,366,668 B1 | 4/2002 | Borst et al. |
| 6,373,817 B1 | 4/2002 | Kung et al. |
| 6,377,662 B1 | 4/2002 | Hunt et al. |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,411,687 B1 | 6/2002 | Bohacek et al. |
| 6,411,692 B1 | 6/2002 | Scherer |
| 6,414,966 B1 | 7/2002 | Kulkarni et al. |
| 6,418,424 B1 | 7/2002 | Hoffberg et al. |
| 6,421,433 B1 | 7/2002 | Arsenault |
| 6,424,840 B1 | 7/2002 | Fitch et al. |
| 6,434,524 B1 | 8/2002 | Weber |
| 6,434,546 B1 | 8/2002 | Williamowski et al. |
| 6,434,687 B1 | 8/2002 | Huppenthal |
| 6,438,520 B1 | 8/2002 | Curt et al. |
| 6,442,247 B1 | 8/2002 | Garcia |
| 6,449,226 B1 | 9/2002 | Kumagai |
| 6,466,654 B1 | 10/2002 | Cooper et al. |
| 6,480,593 B1 | 11/2002 | Munday et al. |
| 6,483,895 B2 | 11/2002 | Bixler et al. |
| 6,483,897 B1 | 11/2002 | Millrod |
| 6,483,899 B2 | 11/2002 | Agraharam et al. |
| 6,484,027 B1 | 11/2002 | Mauney et al. |
| 6,496,567 B1 | 12/2002 | Bjornberg et al. |
| 6,496,836 B1 | 12/2002 | Ronchi et al. |
| 6,501,753 B1 | 12/2002 | Lin et al. |
| 6,502,077 B1 | 12/2002 | Speicher |
| 6,505,055 B1 | 1/2003 | Kahn et al. |
| 6,509,833 B2 | 1/2003 | Tate |
| 6,510,414 B1 | 1/2003 | Chaves |
| 6,513,010 B1 | 1/2003 | Lewin et al. |
| 6,516,060 B1 | 2/2003 | Foladare et al. |
| 6,519,562 B1 | 2/2003 | Phillips et al. |
| 6,522,742 B1 | 2/2003 | Crosby et al. |
| 6,526,126 B1 | 2/2003 | Morganstein et al. |
| 6,529,871 B1 | 3/2003 | Kanevsky et al. |
| 6,532,444 B1 | 3/2003 | Weber |
| 6,535,596 B1 | 3/2003 | Frey et al. |
| 6,538,666 B1 | 3/2003 | Ozawa et al. |
| 6,546,087 B2 | 4/2003 | Shaffer et al. |
| 6,553,112 B2 | 4/2003 | Ishikawa |
| 6,553,113 B1 | 4/2003 | Dhir et al. |
| 6,556,671 B1 | 4/2003 | Beauvois |
| 6,560,329 B1 | 5/2003 | Draginich et al. |
| 6,570,967 B2 | 5/2003 | Katz |
| 6,571,240 B1 | 5/2003 | Ho et al. |
| 6,574,213 B1 | 6/2003 | Anandakumar et al. |
| 6,574,470 B1 | 6/2003 | Chow et al. |
| 6,574,599 B1 | 6/2003 | Lim et al. |
| 6,577,718 B1 | 6/2003 | Kalmanek, Jr. et al. |
| 6,581,033 B1 | 6/2003 | Reynar et al. |
| 6,584,180 B2 | 6/2003 | Nemoto |
| 6,584,191 B1 | 6/2003 | McPartlan et al. |
| 6,587,475 B1 | 7/2003 | Przygienda |
| 6,587,556 B1 | 7/2003 | Judkins et al. |
| 6,587,558 B2 | 7/2003 | Lo |
| 6,587,683 B1 | 7/2003 | Chow et al. |
| 6,589,136 B2 | 7/2003 | Ephraim et al. |
| 6,594,470 B1 | 7/2003 | Barnes et al. |
| 6,597,783 B1 | 7/2003 | Tada et al. |
| 6,598,016 B1 | 7/2003 | Zavoli et al. |
| 6,598,021 B1 | 7/2003 | Shambaugh et al. |
| 6,598,136 B1 | 7/2003 | Narrod et al. |
| 6,600,734 B1 | 7/2003 | Gernert et al. |
| 6,600,736 B1 | 7/2003 | Ball et al. |
| 6,601,014 B1 | 7/2003 | Dempsey |
| 6,601,027 B1 | 7/2003 | Wright et al. |
| 6,603,837 B1 | 8/2003 | Kesanupalli et al. |
| 6,603,854 B1 | 8/2003 | Judkins et al. |
| 6,606,744 B1 | 8/2003 | Mikurak |
| 6,611,681 B2 | 8/2003 | Henderson |
| 6,614,206 B1 | 9/2003 | Wong et al. |
| 6,614,781 B1 | 9/2003 | Elliott et al. |
| 6,614,784 B1 | 9/2003 | Glitho et al. |
| 6,615,209 B1 | 9/2003 | Gomes et al. |
| 6,615,248 B1 | 9/2003 | Smith |
| 6,615,249 B2 | 9/2003 | Schulte Am Hülse |
| 6,625,423 B1 | 9/2003 | Wang |
| 6,631,186 B1 | 10/2003 | Gibson et al. |
| 6,650,088 B1 | 11/2003 | Webb et al. |
| 6,653,722 B2 | 11/2003 | Blalock et al. |
| 6,654,602 B1 | 11/2003 | Fye et al. |
| 6,662,163 B1 | 12/2003 | Albayrak et al. |
| 6,668,241 B2 | 12/2003 | Chen et al. |
| 6,678,355 B2 | 1/2004 | Eringis et al. |
| 6,678,360 B1 | 1/2004 | Katz |
| 6,678,718 B1 | 1/2004 | Khouri et al. |
| 6,680,935 B1 | 1/2004 | Kung et al. |
| 6,681,001 B1 | 1/2004 | Clayton et al. |
| 6,690,788 B1 | 2/2004 | Bauer et al. |
| 6,694,012 B1 | 2/2004 | Posthuma |
| 6,694,482 B1 | 2/2004 | Arellano et al. |
| 6,697,458 B1 | 2/2004 | Kunjibettu |
| 6,697,460 B2 | 2/2004 | Knott et al. |
| 6,697,467 B1 | 2/2004 | Schultz et al. |
| 6,697,806 B1 | 2/2004 | Cook et al. |
| 6,700,972 B1 | 3/2004 | McHugh et al. |
| 6,704,404 B1 | 3/2004 | Burnett |
| 6,704,580 B1 | 3/2004 | Fintel |
| 6,707,789 B1 | 3/2004 | Arslan et al. |
| 6,711,253 B1 | 3/2004 | Prabhaker |
| 6,714,631 B1 | 3/2004 | Martin et al. |
| 6,714,643 B1 | 3/2004 | Gargeya et al. |
| 6,718,023 B1 | 4/2004 | Zolotov |
| 6,721,416 B1 | 4/2004 | Farrel |
| 6,721,882 B1 | 4/2004 | Mbarki |
| 6,725,199 B2 | 4/2004 | Brittan et al. |
| 6,731,625 B1 | 5/2004 | Eastep et al. |
| 6,731,722 B2 | 5/2004 | Coffey |
| 6,732,151 B1 | 5/2004 | Tobias et al. |
| 6,735,432 B1 | 5/2004 | Jarett et al. |

(56) References Cited

U.S. PATENT DOCUMENTS

| | | |
|---|---|---|
| 6,738,082 B1 | 5/2004 | Dong et al. |
| 6,738,473 B1 | 5/2004 | Burg et al. |
| 6,744,861 B1 | 6/2004 | Pershan et al. |
| 6,744,877 B1 | 6/2004 | Edwards |
| 6,745,165 B2 | 6/2004 | Lewis et al. |
| 6,751,306 B2 | 6/2004 | Himmel et al. |
| 6,751,591 B1 | 6/2004 | Gorin et al. |
| 6,757,306 B1 | 6/2004 | Klish et al. |
| 6,763,095 B1 | 7/2004 | Cermak et al. |
| 6,766,175 B2 | 7/2004 | Uchiyama |
| 6,766,320 B1 | 7/2004 | Wang et al. |
| 6,775,359 B1 | 8/2004 | Ron et al. |
| 6,778,643 B1 | 8/2004 | Bushey et al. |
| 6,782,412 B2 | 8/2004 | Brophy et al. |
| 6,792,096 B2 | 9/2004 | Martin et al. |
| 6,795,806 B1 | 9/2004 | Lewis et al. |
| 6,798,768 B1 | 9/2004 | Gallick et al. |
| 6,798,876 B1 | 9/2004 | Bala |
| 6,801,520 B2 | 10/2004 | Philonenko |
| 6,801,751 B1 | 10/2004 | Wood et al. |
| 6,807,274 B2 | 10/2004 | Joseph et al. |
| 6,823,307 B1 | 11/2004 | Steinbiss et al. |
| 6,826,264 B2 | 11/2004 | Valco et al. |
| 6,831,932 B1 | 12/2004 | Boyle et al. |
| 6,832,224 B2 | 12/2004 | Gilmour |
| 6,836,760 B1 | 12/2004 | Bellegarda et al. |
| 6,842,504 B2 | 1/2005 | Mills et al. |
| 6,847,711 B2 | 1/2005 | Knott et al. |
| 6,847,715 B1 | 1/2005 | Swartz |
| 6,850,611 B1 | 2/2005 | Chalk |
| 6,853,722 B2 | 2/2005 | Joseph et al. |
| 6,853,966 B2 | 2/2005 | Bushey et al. |
| 6,856,806 B1 | 2/2005 | Bosik et al. |
| 6,859,529 B2 | 2/2005 | Duncan et al. |
| 6,871,179 B1 | 3/2005 | Kist et al. |
| 6,871,212 B2 | 3/2005 | Khouri et al. |
| 6,873,693 B1 | 3/2005 | Langseth et al. |
| 6,879,683 B1 | 4/2005 | Fain et al. |
| 6,882,641 B1 | 4/2005 | Gallick et al. |
| 6,882,723 B1 | 4/2005 | Peterson et al. |
| 6,885,734 B1 | 4/2005 | Eberle et al. |
| 6,891,932 B2 | 5/2005 | Bhargava et al. |
| 6,892,083 B2 | 5/2005 | Shostak |
| 6,892,169 B1 | 5/2005 | Campbell et al. |
| 6,895,083 B1 | 5/2005 | Bers et al. |
| 6,895,532 B2 | 5/2005 | Raynham |
| 6,901,366 B1 | 5/2005 | Kuhn et al. |
| 6,907,119 B2 | 6/2005 | Case et al. |
| 6,909,708 B1 | 6/2005 | Krishnaswamy et al. |
| 6,914,974 B2 | 7/2005 | Bonnin |
| 6,915,246 B2 | 7/2005 | Gusler et al. |
| 6,922,689 B2 | 7/2005 | Shtivelman |
| 6,925,155 B2 | 8/2005 | Reynolds et al. |
| 6,925,432 B2 | 8/2005 | Lee et al. |
| 6,937,975 B1 | 8/2005 | Elworthy |
| 6,944,592 B1 | 9/2005 | Pickering |
| 6,944,593 B2 | 9/2005 | Kuzunuki et al. |
| 6,963,983 B2 | 11/2005 | Munson et al. |
| 6,964,023 B2 | 11/2005 | Maes et al. |
| 6,970,554 B1 | 11/2005 | Peterson et al. |
| 6,978,154 B1 | 12/2005 | Ospalak et al. |
| 6,978,163 B2 | 12/2005 | Dyer et al. |
| 6,999,755 B2 | 2/2006 | Park |
| 7,003,079 B1 | 2/2006 | McCarthy et al. |
| 7,006,605 B1 | 2/2006 | Morganstein et al. |
| 7,006,607 B2 | 2/2006 | Garcia |
| 7,013,112 B2 | 3/2006 | Haller et al. |
| 7,013,464 B2 | 3/2006 | Osborn |
| 7,016,849 B2 | 3/2006 | Arnold et al. |
| 7,020,256 B2 | 3/2006 | Jain et al. |
| 7,024,368 B1 | 4/2006 | Matheson |
| 7,027,586 B2 | 4/2006 | Bushey et al. |
| 7,027,975 B1 | 4/2006 | Pazandak et al. |
| 7,031,444 B2 | 4/2006 | Shen et al. |
| 7,031,908 B1 | 4/2006 | Huang et al. |
| 7,035,388 B2 | 4/2006 | Kurosaki et al. |
| 7,039,166 B1 | 5/2006 | Peterson et al. |
| 7,043,435 B2 | 5/2006 | Knott et al. |
| 7,050,936 B2 | 5/2006 | Levy et al. |
| 7,062,029 B2 | 6/2006 | Lund |
| 7,062,505 B2 | 6/2006 | Lane et al. |
| 7,065,201 B2 | 6/2006 | Bushey et al. |
| 7,072,457 B2 | 7/2006 | Brown et al. |
| 7,072,643 B2 | 7/2006 | Pines et al. |
| 7,072,659 B2 | 7/2006 | White, Jr. |
| 7,076,049 B2 | 7/2006 | Bushey et al. |
| 7,076,695 B2 | 7/2006 | McGee et al. |
| 7,092,370 B2 | 8/2006 | Jiang et al. |
| 7,092,888 B1 | 8/2006 | McCarthy et al. |
| 7,092,901 B2 | 8/2006 | Davis et al. |
| 7,095,827 B2 | 8/2006 | Guedalia |
| 7,095,842 B2 | 8/2006 | Brown et al. |
| 7,102,780 B2 | 9/2006 | Watanabe |
| 7,103,165 B2 | 9/2006 | Baniak et al. |
| 7,103,542 B2 | 9/2006 | Doyle |
| 7,106,850 B2 | 9/2006 | Campbell et al. |
| 7,110,512 B2 | 9/2006 | Maropis et al. |
| 7,110,949 B2 | 9/2006 | Bushey et al. |
| 7,124,059 B2 | 10/2006 | Wetzer et al. |
| 7,127,398 B1 | 10/2006 | Yamagishi et al. |
| 7,127,400 B2 | 10/2006 | Koch |
| 7,130,411 B2 | 10/2006 | Brown et al. |
| 7,131,577 B2 | 11/2006 | Obara et al. |
| 7,133,504 B2 | 11/2006 | Fostick |
| 7,133,828 B2 | 11/2006 | Scarano et al. |
| 7,139,390 B2 | 11/2006 | Brown et al. |
| 7,142,652 B2 | 11/2006 | Ho |
| 7,149,525 B2 | 12/2006 | White, Jr. |
| 7,177,397 B2 | 2/2007 | McCalmont et al. |
| 7,177,792 B2 | 2/2007 | Knight et al. |
| 7,184,534 B2 | 2/2007 | Birch et al. |
| 7,184,540 B2 | 2/2007 | Dezonno et al. |
| 7,191,435 B2 | 3/2007 | Lau et al. |
| 7,197,130 B2 | 3/2007 | Paden |
| 7,200,614 B2 | 4/2007 | Reid et al. |
| 7,206,400 B2 | 4/2007 | Dezonno et al. |
| 7,215,745 B2 | 5/2007 | Peters |
| 7,215,759 B2 | 5/2007 | Brown et al. |
| 7,224,792 B2 | 5/2007 | Fusco |
| 7,231,343 B1 | 6/2007 | Treadgold et al. |
| 7,231,384 B2 | 6/2007 | Wu et al. |
| 7,233,908 B1 | 6/2007 | Nelson |
| 7,233,980 B1 | 6/2007 | Holden et al. |
| 7,242,751 B2 | 7/2007 | Bushey et al. |
| 7,245,711 B2 | 7/2007 | Margolis |
| 7,245,716 B2 | 7/2007 | Brown et al. |
| 7,260,537 B2 | 8/2007 | Creamer et al. |
| 7,272,217 B1 | 9/2007 | Kocharlakota |
| 7,277,922 B1 | 10/2007 | Contractor |
| 7,277,924 B1 | 10/2007 | Wichmann et al. |
| 7,287,214 B1 | 10/2007 | Jenkins et al. |
| 7,313,229 B1 | 12/2007 | Sherwood |
| 7,317,787 B2 | 1/2008 | Crockett et al. |
| 7,336,775 B2 | 2/2008 | Tanaka et al. |
| 7,346,152 B2 | 3/2008 | Paden et al. |
| 7,346,507 B1 | 3/2008 | Natarajan et al. |
| 7,349,843 B1 | 3/2008 | Beck |
| 7,353,033 B2 | 4/2008 | Kwon |
| 7,356,475 B2 | 4/2008 | Novack et al. |
| 7,369,653 B2 | 5/2008 | Dezonno et al. |
| 7,370,086 B2 | 5/2008 | Kroeker et al. |
| 7,379,867 B2 | 5/2008 | Chelba et al. |
| 7,379,876 B2 | 5/2008 | Nakata |
| 7,379,886 B1 | 5/2008 | Zaring et al. |
| 7,415,101 B2 | 8/2008 | Bushey et al. |
| 7,421,389 B2 | 9/2008 | Reynolds et al. |
| 7,430,554 B1 | 9/2008 | Heisinger, Jr. |
| 7,443,963 B2 | 10/2008 | Scherer |
| 7,447,299 B1 | 11/2008 | Partovi et al. |
| 7,447,662 B2 | 11/2008 | Gibson |
| 7,450,698 B2 | 11/2008 | Bushey et al. |
| 7,454,005 B2 | 11/2008 | Malik |
| 7,460,650 B2 | 12/2008 | Bushey et al. |
| 7,487,095 B2 | 2/2009 | Hill et al. |

(56) References Cited

U.S. PATENT DOCUMENTS

| | | |
|---|---|---|
| 7,487,112 B2 | 2/2009 | Barnes, Jr. |
| 7,506,241 B2 | 3/2009 | Chefalas et al. |
| 7,512,545 B2 | 3/2009 | Knott et al. |
| 7,516,190 B2 | 4/2009 | Kurganov |
| 7,545,925 B2 | 6/2009 | Williams |
| 7,551,723 B2 | 6/2009 | Mills et al. |
| 7,573,990 B2 | 8/2009 | Galvin |
| 7,580,837 B2 | 8/2009 | Bushey et al. |
| 7,602,898 B2 | 10/2009 | Klein |
| 7,602,899 B1 | 10/2009 | Thenthiruperai |
| 7,616,944 B2 | 11/2009 | Gustavsson et al. |
| 7,620,159 B2 | 11/2009 | Pasquale et al. |
| 7,620,168 B2 | 11/2009 | Ekstrom |
| 7,623,632 B2 | 11/2009 | Bushey et al. |
| 7,627,096 B2 | 12/2009 | Bushey et al. |
| 7,627,109 B2 | 12/2009 | Mitra |
| 7,636,432 B2 | 12/2009 | Bushey et al. |
| 7,647,582 B2 | 1/2010 | Krishnaswamy et al. |
| 7,657,005 B2 | 2/2010 | Chang |
| 7,657,020 B2 | 2/2010 | Bushey et al. |
| 7,660,233 B2 | 2/2010 | Paden et al. |
| 7,660,715 B1 | 2/2010 | Thambiratnam |
| 7,668,889 B2 | 2/2010 | Edwards |
| 7,684,989 B1 | 3/2010 | Collins et al. |
| 7,685,270 B1 | 3/2010 | Vermeulen et al. |
| 7,702,532 B2 | 4/2010 | Vigil |
| 7,720,203 B2 | 5/2010 | Bushey et al. |
| 7,724,889 B2 | 5/2010 | Bushey et al. |
| 7,739,717 B1 | 6/2010 | Kuether et al. |
| 7,751,551 B2 | 7/2010 | Bushey et al. |
| RE41,608 E | 8/2010 | Blair et al. |
| 7,783,029 B2 | 8/2010 | Whitecotten et al. |
| 7,864,942 B2 | 1/2011 | Knott et al. |
| 7,881,656 B2 | 2/2011 | Khedouri et al. |
| 7,900,542 B2 | 3/2011 | Kapolnek |
| 7,933,399 B2 | 4/2011 | Knott et al. |
| 7,936,861 B2 | 5/2011 | Knott et al. |
| 7,939,432 B2 | 5/2011 | Chiang et al. |
| 7,966,176 B2 | 6/2011 | Bushey et al. |
| 8,005,204 B2 | 8/2011 | Bushey et al. |
| 8,051,086 B2 | 11/2011 | Jeffs et al. |
| 8,090,086 B2 | 1/2012 | Chang |
| 8,090,091 B2 | 1/2012 | Ekstrom |
| 8,130,936 B2 | 3/2012 | Kortum et al. |
| 8,139,727 B2 | 3/2012 | Awad et al. |
| 8,165,281 B2 | 4/2012 | Joseph |
| 8,170,197 B2 | 5/2012 | Odinak |
| 8,175,253 B2 | 5/2012 | Knott et al. |
| 8,223,954 B2 | 7/2012 | Mahoney et al. |
| 8,295,469 B2 | 10/2012 | Bushey et al. |
| 8,306,192 B2 | 11/2012 | Bushey et al. |
| 8,321,446 B2 | 11/2012 | Edwards et al. |
| 8,401,851 B2 | 3/2013 | Bushey et al. |
| 8,488,770 B2 | 7/2013 | Mahoney et al. |
| 8,503,662 B2 | 8/2013 | Bushey et al. |
| 2001/0011211 A1 | 8/2001 | Bushey et al. |
| 2001/0014599 A1 | 8/2001 | Henderson |
| 2001/0018672 A1 | 8/2001 | Petters et al. |
| 2001/0019604 A1 | 9/2001 | Joyce et al. |
| 2001/0019955 A1 | 9/2001 | Henderson |
| 2001/0021948 A1 | 9/2001 | Khouri et al. |
| 2001/0024497 A1 | 9/2001 | Campbell et al. |
| 2001/0026608 A1 | 10/2001 | Beyda et al. |
| 2001/0032075 A1 | 10/2001 | Yamamoto |
| 2001/0032211 A1 | 10/2001 | Kuzumaki |
| 2001/0032229 A1 | 10/2001 | Hulls et al. |
| 2001/0033570 A1 | 10/2001 | Makam et al. |
| 2001/0034662 A1 | 10/2001 | Morris |
| 2002/0007303 A1 | 1/2002 | Brookler et al. |
| 2002/0016757 A1 | 2/2002 | Johnson et al. |
| 2002/0023251 A1 | 2/2002 | Nasr et al. |
| 2002/0026394 A1 | 2/2002 | Savage et al. |
| 2002/0032675 A1 | 3/2002 | Williamowski et al. |
| 2002/0046030 A1 | 4/2002 | Haritsa et al. |
| 2002/0049874 A1 | 4/2002 | Kimura |
| 2002/0055975 A1 | 5/2002 | Petrovykh |
| 2002/0056000 A1 | 5/2002 | Coussement |
| 2002/0057678 A1 | 5/2002 | Jiang et al. |
| 2002/0059164 A1 | 5/2002 | Shtivelman |
| 2002/0059169 A1 | 5/2002 | Quarterman et al. |
| 2002/0064149 A1 | 5/2002 | Elliott et al. |
| 2002/0067714 A1 | 6/2002 | Crain et al. |
| 2002/0067820 A1 | 6/2002 | Benson et al. |
| 2002/0073434 A1 | 6/2002 | Pience |
| 2002/0080025 A1 | 6/2002 | Beattie |
| 2002/0087310 A1 | 7/2002 | Lee et al. |
| 2002/0087316 A1 | 7/2002 | Lee et al. |
| 2002/0087385 A1 | 7/2002 | Vincent |
| 2002/0087558 A1 | 7/2002 | Bailey et al. |
| 2002/0091617 A1 | 7/2002 | Keith |
| 2002/0106065 A1 | 8/2002 | Joyce et al. |
| 2002/0111190 A1 | 8/2002 | Harrison et al. |
| 2002/0114432 A1 | 8/2002 | Shaffer et al. |
| 2002/0115480 A1 | 8/2002 | Huang |
| 2002/0116174 A1 | 8/2002 | Lee et al. |
| 2002/0116336 A1 | 8/2002 | Diacakis et al. |
| 2002/0119800 A1 | 8/2002 | Jaggers et al. |
| 2002/0122544 A1 | 9/2002 | Williams et al. |
| 2002/0133394 A1 | 9/2002 | Bushey et al. |
| 2002/0133413 A1 | 9/2002 | Chang et al. |
| 2002/0135618 A1 | 9/2002 | Maes et al. |
| 2002/0137472 A1 | 9/2002 | Quinn et al. |
| 2002/0143548 A1 | 10/2002 | Korall et al. |
| 2002/0156699 A1 | 10/2002 | Gray et al. |
| 2002/0165732 A1 | 11/2002 | Ezzeddine et al. |
| 2002/0169606 A1 | 11/2002 | Bantz et al. |
| 2002/0178005 A1 | 11/2002 | Dusan et al. |
| 2002/0181442 A1 | 12/2002 | Rajani |
| 2002/0188438 A1 | 12/2002 | Knight et al. |
| 2002/0196277 A1 | 12/2002 | Bushey et al. |
| 2002/0198714 A1 | 12/2002 | Zhou |
| 2002/0198967 A1 | 12/2002 | Iwanojko et al. |
| 2003/0003900 A1 | 1/2003 | Goss et al. |
| 2003/0007609 A1 | 1/2003 | Yuen et al. |
| 2003/0007620 A1 | 1/2003 | Elsey et al. |
| 2003/0009339 A1 | 1/2003 | Yuen et al. |
| 2003/0014335 A1 | 1/2003 | Lecheler-Moore et al. |
| 2003/0018659 A1 | 1/2003 | Fuks et al. |
| 2003/0026409 A1 | 2/2003 | Bushey et al. |
| 2003/0028498 A1 | 2/2003 | Hayes-Roth |
| 2003/0035381 A1 | 2/2003 | Chen et al. |
| 2003/0035516 A1 | 2/2003 | Guedalia |
| 2003/0039242 A1 | 2/2003 | Moore, Jr. |
| 2003/0048195 A1 | 3/2003 | Trossen |
| 2003/0064720 A1 | 4/2003 | Valins et al. |
| 2003/0069937 A1 | 4/2003 | Khouri et al. |
| 2003/0092451 A1 | 5/2003 | Holloway et al. |
| 2003/0095651 A1 | 5/2003 | Book et al. |
| 2003/0097428 A1 | 5/2003 | Afkhami et al. |
| 2003/0103619 A1 | 6/2003 | Brown et al. |
| 2003/0108183 A1 | 6/2003 | Dhir et al. |
| 2003/0112956 A1 | 6/2003 | Brown et al. |
| 2003/0114105 A1 | 6/2003 | Hailer et al. |
| 2003/0115257 A1 | 6/2003 | Zyarko et al. |
| 2003/0115289 A1 | 6/2003 | Chinn et al. |
| 2003/0118159 A1 | 6/2003 | Shen et al. |
| 2003/0125075 A1 | 7/2003 | Klovborg |
| 2003/0125945 A1 | 7/2003 | Doyle |
| 2003/0130841 A1 | 7/2003 | Bangalore et al. |
| 2003/0130864 A1 | 7/2003 | Ho et al. |
| 2003/0133421 A1 | 7/2003 | Sundar et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0149653 A1 | 8/2003 | Penney et al. |
| 2003/0154184 A1 | 8/2003 | Chee et al. |
| 2003/0156133 A1 | 8/2003 | Martin et al. |
| 2003/0165223 A1 | 9/2003 | Timmins et al. |
| 2003/0179876 A1 | 9/2003 | Fox et al. |
| 2003/0181202 A1 | 9/2003 | Link, II et al. |
| 2003/0187632 A1 | 10/2003 | Menich |
| 2003/0187732 A1 | 10/2003 | Seta |
| 2003/0187773 A1 | 10/2003 | Santos et al. |
| 2003/0187865 A1 | 10/2003 | Frisina |

(56) References Cited

U.S. PATENT DOCUMENTS

| | | |
|---|---|---|
| 2003/0191648 A1 | 10/2003 | Knott et al. |
| 2003/0194063 A1 | 10/2003 | Martin et al. |
| 2003/0195753 A1 | 10/2003 | Homuth |
| 2003/0200298 A1 | 10/2003 | Su et al. |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0212558 A1 | 11/2003 | Matula |
| 2003/0228007 A1 | 12/2003 | Kurosaki |
| 2003/0235282 A1 | 12/2003 | Sichelman et al. |
| 2003/0235287 A1 | 12/2003 | Margolis |
| 2004/0005047 A1 | 1/2004 | Joseph et al. |
| 2004/0006473 A1 | 1/2004 | Mills et al. |
| 2004/0018774 A1 | 1/2004 | Long et al. |
| 2004/0028213 A1 | 2/2004 | Goss |
| 2004/0030649 A1 | 2/2004 | Nelson et al. |
| 2004/0032484 A1 | 2/2004 | Halttunen |
| 2004/0032862 A1 | 2/2004 | Schoeneberger et al. |
| 2004/0032935 A1 | 2/2004 | Mills et al. |
| 2004/0037401 A1 | 2/2004 | Dow et al. |
| 2004/0042592 A1 | 3/2004 | Knott et al. |
| 2004/0044950 A1 | 3/2004 | Mills et al. |
| 2004/0047453 A1 | 3/2004 | Fraser |
| 2004/0063424 A1 | 4/2004 | Silberstein et al. |
| 2004/0066401 A1 | 4/2004 | Bushey et al. |
| 2004/0066416 A1 | 4/2004 | Knott et al. |
| 2004/0066776 A1 | 4/2004 | Ishidoshiro |
| 2004/0072544 A1 | 4/2004 | Alexis |
| 2004/0073569 A1 | 4/2004 | Knott et al. |
| 2004/0083206 A1 | 4/2004 | Wu et al. |
| 2004/0083479 A1 | 4/2004 | Bondarenko et al. |
| 2004/0088285 A1 | 5/2004 | Martin et al. |
| 2004/0101127 A1 | 5/2004 | Dezonno et al. |
| 2004/0103017 A1 | 5/2004 | Reed et al. |
| 2004/0109555 A1 | 6/2004 | Williams |
| 2004/0111269 A1 | 6/2004 | Koch |
| 2004/0111479 A1 | 6/2004 | Borden et al. |
| 2004/0116073 A1 | 6/2004 | Mauney et al. |
| 2004/0117185 A1 | 6/2004 | Scarano et al. |
| 2004/0120473 A1 | 6/2004 | Birch et al. |
| 2004/0120492 A1 | 6/2004 | Lew et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0127241 A1 | 7/2004 | Shostak |
| 2004/0128624 A1 | 7/2004 | Arellano et al. |
| 2004/0156491 A1 | 8/2004 | Reding et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0162724 A1 | 8/2004 | Hill et al. |
| 2004/0174980 A1 | 9/2004 | Knott et al. |
| 2004/0199394 A1 | 10/2004 | Kuzunuki et al. |
| 2004/0202309 A1 | 10/2004 | Baggenstoss et al. |
| 2004/0203374 A1 | 10/2004 | Zilliacus |
| 2004/0204056 A1 | 10/2004 | Phelps, III |
| 2004/0213212 A1 | 10/2004 | Reding et al. |
| 2004/0230438 A1 | 11/2004 | Pasquale et al. |
| 2004/0230506 A1 | 11/2004 | Casco-Arias et al. |
| 2004/0240635 A1 | 12/2004 | Bushey et al. |
| 2004/0243568 A1 | 12/2004 | Wang et al. |
| 2004/0259541 A1 | 12/2004 | Hicks, III et al. |
| 2004/0264677 A1 | 12/2004 | Horvitz et al. |
| 2004/0266425 A1 | 12/2004 | Gonsalves et al. |
| 2005/0008141 A1 | 1/2005 | Kortum et al. |
| 2005/0015197 A1 | 1/2005 | Ohtsuji et al. |
| 2005/0015256 A1 | 1/2005 | Kargman |
| 2005/0015744 A1 | 1/2005 | Bushey et al. |
| 2005/0018825 A1 | 1/2005 | Ho |
| 2005/0020236 A1 | 1/2005 | Mauney et al. |
| 2005/0021567 A1 | 1/2005 | Holenstein et al. |
| 2005/0027535 A1 | 2/2005 | Martin et al. |
| 2005/0032475 A1 | 2/2005 | Mauney et al. |
| 2005/0041647 A1 | 2/2005 | Stinnie |
| 2005/0041796 A1 | 2/2005 | Joseph et al. |
| 2005/0047578 A1 | 3/2005 | Knott et al. |
| 2005/0049874 A1 | 3/2005 | Coffman et al. |
| 2005/0049940 A1 | 3/2005 | Tengler et al. |
| 2005/0054335 A1 | 3/2005 | Pearson et al. |
| 2005/0055216 A1 | 3/2005 | Bushey et al. |
| 2005/0055599 A1 | 3/2005 | Bravo et al. |
| 2005/0058264 A1 | 3/2005 | Joseph et al. |
| 2005/0060200 A1 | 3/2005 | Kobylevsky et al. |
| 2005/0063360 A1 | 3/2005 | Lowmaster |
| 2005/0063528 A1 | 3/2005 | Pearson et al. |
| 2005/0064853 A1 | 3/2005 | Radpour |
| 2005/0064855 A1 | 3/2005 | Russell |
| 2005/0066416 A1 | 3/2005 | Ma |
| 2005/0075894 A1 | 4/2005 | Bushey et al. |
| 2005/0075984 A1 | 4/2005 | Bourrieres et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0081696 A1 | 4/2005 | Kapolnek |
| 2005/0096024 A1 | 5/2005 | Bicker et al. |
| 2005/0097034 A1 | 5/2005 | Loeger et al. |
| 2005/0102141 A1 | 5/2005 | Chikuri |
| 2005/0111653 A1 | 5/2005 | Joyce et al. |
| 2005/0113077 A1 | 5/2005 | Bushnell et al. |
| 2005/0125232 A1 | 6/2005 | Gadd |
| 2005/0131708 A1 | 6/2005 | Palma et al. |
| 2005/0131892 A1 | 6/2005 | Knott et al. |
| 2005/0132262 A1 | 6/2005 | Bushey et al. |
| 2005/0135575 A1 | 6/2005 | Haskey et al. |
| 2005/0135595 A1 | 6/2005 | Bushey et al. |
| 2005/0141479 A1 | 6/2005 | Ozugur et al. |
| 2005/0141692 A1 | 6/2005 | Scherer et al. |
| 2005/0141694 A1 | 6/2005 | Wengrovitz |
| 2005/0147218 A1 | 7/2005 | Novack et al. |
| 2005/0152530 A1 | 7/2005 | Pence et al. |
| 2005/0152531 A1 | 7/2005 | Hamilton, II et al. |
| 2005/0161002 A1 | 7/2005 | Robinson |
| 2005/0169441 A1 | 8/2005 | Yacoub et al. |
| 2005/0169449 A1 | 8/2005 | Coughlin, Jr. et al. |
| 2005/0169453 A1 | 8/2005 | Knott et al. |
| 2005/0171877 A1 | 8/2005 | Weiss |
| 2005/0172033 A1 | 8/2005 | Mathew et al. |
| 2005/0172148 A1 | 8/2005 | Ying |
| 2005/0195961 A1 | 9/2005 | Pasquale et al. |
| 2005/0201531 A1 | 9/2005 | Kanter et al. |
| 2005/0201547 A1 | 9/2005 | Burg et al. |
| 2005/0210101 A1 | 9/2005 | Janik |
| 2005/0210143 A1 | 9/2005 | Wengrovitz |
| 2005/0213743 A1 | 9/2005 | Huet et al. |
| 2005/0240411 A1 | 10/2005 | Yacoub |
| 2005/0254632 A1 | 11/2005 | Pasquale et al. |
| 2005/0273781 A1 | 12/2005 | Nakamura et al. |
| 2005/0277431 A1 | 12/2005 | White |
| 2005/0278655 A1 | 12/2005 | Sims |
| 2005/0282582 A1 | 12/2005 | Slotznick |
| 2005/0288927 A1 | 12/2005 | Kim et al. |
| 2006/0002540 A1 | 1/2006 | Kreiner et al. |
| 2006/0003806 A1 | 1/2006 | Weber et al. |
| 2006/0018443 A1 | 1/2006 | Knott et al. |
| 2006/0023863 A1 | 2/2006 | Joseph et al. |
| 2006/0025995 A1 | 2/2006 | Erhart et al. |
| 2006/0026049 A1 | 2/2006 | Joseph |
| 2006/0027097 A1 | 2/2006 | Lee |
| 2006/0031587 A1 | 2/2006 | Paterson et al. |
| 2006/0036437 A1 | 2/2006 | Bushey et al. |
| 2006/0039547 A1 | 2/2006 | Klein et al. |
| 2006/0050865 A1 | 3/2006 | Kortum et al. |
| 2006/0056287 A1 | 3/2006 | Paden et al. |
| 2006/0056406 A1 | 3/2006 | Bouchard et al. |
| 2006/0062375 A1 | 3/2006 | Pasquale |
| 2006/0072737 A1 | 4/2006 | Paden et al. |
| 2006/0073013 A1 | 4/2006 | Emigholz et al. |
| 2006/0083357 A1 | 4/2006 | Howell et al. |
| 2006/0085538 A1 | 4/2006 | Newman et al. |
| 2006/0093097 A1 | 5/2006 | Chang |
| 2006/0100998 A1 | 5/2006 | Edwards et al. |
| 2006/0109974 A1 | 5/2006 | Paden |
| 2006/0109976 A1 | 5/2006 | Sundaram et al. |

(56) References Cited

U.S. PATENT DOCUMENTS

| | | | |
|---|---|---|---|
| 2006/0115070 A1 | 6/2006 | Bushey et al. |
| 2006/0126808 A1 | 6/2006 | Dallessandro et al. |
| 2006/0126811 A1 | 6/2006 | Bushey et al. |
| 2006/0133587 A1 | 6/2006 | Bushey et al. |
| 2006/0146806 A1 | 7/2006 | Khuc et al. |
| 2006/0153345 A1 | 7/2006 | Bushey et al. |
| 2006/0159116 A1 | 7/2006 | Gerszberg et al. |
| 2006/0159240 A1 | 7/2006 | Bushey et al. |
| 2006/0161431 A1 | 7/2006 | Bushey et al. |
| 2006/0165057 A1 | 7/2006 | Paden et al. |
| 2006/0165066 A1 | 7/2006 | Campbell et al. |
| 2006/0176824 A1 | 8/2006 | Laver et al. |
| 2006/0177040 A1 | 8/2006 | Mitra et al. |
| 2006/0182252 A1 | 8/2006 | Harris et al. |
| 2006/0187954 A1 | 8/2006 | Braschi et al. |
| 2006/0188075 A1 | 8/2006 | Peterson |
| 2006/0188087 A1 | 8/2006 | Kortum et al. |
| 2006/0190424 A1 | 8/2006 | Beale et al. |
| 2006/0195312 A1 | 8/2006 | Knight et al. |
| 2006/0198505 A1 | 9/2006 | Kortum et al. |
| 2006/0215831 A1 | 9/2006 | Knott et al. |
| 2006/0215833 A1 | 9/2006 | Mahoney et al. |
| 2006/0251094 A1 | 11/2006 | Van Vleck et al. |
| 2006/0251229 A1 | 11/2006 | Gorti et al. |
| 2006/0256932 A1 | 11/2006 | Bushey et al. |
| 2006/0256952 A1 | 11/2006 | Rogers et al. |
| 2006/0256956 A1 | 11/2006 | Lee et al. |
| 2006/0285535 A1 | 12/2006 | Metcalf et al. |
| 2006/0291642 A1 | 12/2006 | Bushey et al. |
| 2006/0291644 A1 | 12/2006 | Ellinwood et al. |
| 2007/0019800 A1 | 1/2007 | Bushey et al. |
| 2007/0025528 A1 | 2/2007 | Knott et al. |
| 2007/0025542 A1 | 2/2007 | Bushey et al. |
| 2007/0041551 A1 | 2/2007 | Whitecotten et al. |
| 2007/0047718 A1 | 3/2007 | Idler |
| 2007/0047720 A1 | 3/2007 | Brandt et al. |
| 2007/0047728 A1 | 3/2007 | Raju et al. |
| 2007/0116230 A1 | 5/2007 | Brandt et al. |
| 2007/0136060 A1 | 6/2007 | Hennecke et al. |
| 2007/0192362 A1 | 8/2007 | Caballero et al. |
| 2007/0206734 A1 | 9/2007 | Hagale et al. |
| 2007/0206772 A1 | 9/2007 | Sato et al. |
| 2007/0260539 A1 | 11/2007 | Delinsky et al. |
| 2008/0008308 A1 | 1/2008 | Knott et al. |
| 2008/0048861 A1 | 2/2008 | Naidoo et al. |
| 2008/0049779 A1 | 2/2008 | Hopmann et al. |
| 2008/0084975 A1 | 4/2008 | Schwartz |
| 2008/0152094 A1 | 6/2008 | Perlmutter |
| 2008/0154601 A1 | 6/2008 | Stifelman et al. |
| 2008/0154773 A1 | 6/2008 | Ranzini et al. |
| 2008/0273687 A1 | 11/2008 | Knott et al. |
| 2009/0019141 A1 | 1/2009 | Bush et al. |
| 2009/0067590 A1 | 3/2009 | Bushey et al. |
| 2009/0171799 A1 | 7/2009 | Ying |
| 2009/0287484 A1 | 11/2009 | Bushey |
| 2010/0040207 A1 | 2/2010 | Bushey et al. |
| 2010/0054449 A1 | 3/2010 | Bushey et al. |
| 2010/0232595 A1 | 9/2010 | Bushey et al. |
| 2013/0010947 A1 | 1/2013 | Bushey et al. |
| 2013/0058466 A1 | 3/2013 | Bushey et al. |
| 2013/0151253 A1 | 6/2013 | Bushey et al. |
| 2013/0230162 A1 | 9/2013 | Bushey |
| 2013/0294596 A1 | 11/2013 | Bushey et al. |

FOREIGN PATENT DOCUMENTS

| | | |
|---|---|---|
| EP | 0424015 B1 | 4/1991 |
| EP | 0671859 A2 | 9/1995 |
| EP | 0713345 A2 | 5/1996 |
| EP | 0876652 A4 | 9/1996 |
| EP | 0876652 A1 | 11/1998 |
| GB | 2305078 A | 3/1997 |
| JP | 08163646 A | 6/1996 |
| JP | 08172673 A | 7/1996 |
| JP | 08294168 A | 11/1996 |
| JP | 08294170 A | 11/1996 |
| JP | 08317468 A | 11/1996 |
| JP | 08322087 A | 12/1996 |
| JP | 0937345 A | 2/1997 |
| JP | 0955981 A | 2/1997 |
| JP | 0984117 A | 3/1997 |
| JP | 0998476 A | 4/1997 |
| WO | 9405101 A1 | 3/1994 |
| WO | WO9726612 | 7/1997 |
| WO | 0137539 A2 | 5/2001 |
| WO | 0137539 A3 | 5/2001 |
| WO | WO0137539 A2 | 5/2001 |
| WO | WO0137539 A3 | 5/2001 |
| WO | WO2004017584 | 2/2004 |
| WO | 2004049222 A2 | 6/2004 |
| WO | WO2004049222 A2 | 6/2004 |
| WO | 2005006713 A5 | 1/2005 |
| WO | 2005036330 A3 | 4/2005 |
| WO | 2005048577 A1 | 5/2005 |
| WO | 2006014195 A3 | 2/2006 |
| WO | 2006062707 A2 | 6/2006 |
| WO | 2006062854 A2 | 6/2006 |
| WO | 2006065526 A2 | 6/2006 |
| WO | 2007021444 A3 | 2/2007 |

OTHER PUBLICATIONS

"Non-Final Office Action for U.S. Appl. No. 10/917,233", United States Patent and Trademark Office (USPTO), mail date Dec. 16, 2008, 36 pages.

"Non-Final Office Action for U.S. Appl. No. 10/917,233", United States Patent and Trademark Office (USPTO), mail date Dec. 20, 2007, 30 pages.

"Non-Final Office Action for U.S. Appl. No. 12/503,586", United States Patent and Trademark Office (USPTO), mail date Mar. 7, 2011, 16 pages.

"Non-Final Office Action for U.S. Appl. No. 12/503,586", United States Patent and Trademark Office (USPTO), mail date Sep. 20, 2010, 16 pages.

"Notice of Allowance and Fee(s) Due for U.S. Appl. No. 10/917,233", United States Patent and Trademark Office (USPTO), mail date May 18, 2009, 24 pages.

"Notice of Allowance and Fee(s) Due for U.S. Appl. No. 12/503,586", United States Patent and Trademark Office (USPTO), mail date Nov. 8, 2012; 33 pages.

"Notice of Allowance and Fee(s) Due for U.S. Appl. No. 12/503,586", United States Patent and Trademark Office (USPTO), mail date Aug. 9, 2011, 14 pages.

Ogino, Tsukasa et al., "Technologies for Internet Infrastructure: Eliminating the World Wide Wait", iNet Japan, Jul. 18-21, 2000; www.isoc.org/inet2000/cdproceedings/1g/index.

Supplementary European Search Report, EP0876652, Application No. 97903925, Apr. 14, 1999, 26 pages.

International Search Report and Written Opinion of the International Search Authority for International Application No. PCT/US04/16017 from the International Searching Authority (EPO), mailed on Aug. 16, 2005, 5 pages.

International Search Report and Written Opinion of the International Search Authority for International Application No. PCT/US04/28260 from the International Searching Authority (EPO), mailed on Sep. 30, 2005, 7 pages.

International Search Report and Written Opinion of the International Search Authority for International Application No. PCT/US04/34239 from the International Searching Authority (EPO), mailed on Feb. 17, 2005, 7 pages.

International Search Report and Written Opinion of the International Search Authority for International Application No. PCT/US05/16449 from the International Searching Authority (EPO), mailed on Apr. 10, 2006, 7 pages.

(56) References Cited

OTHER PUBLICATIONS

International Search Report and Written Opinion of the International Search Authority for International Application No. PCT/US05/41473 from the International Searching Authority (EPO), mailed on Jun. 28, 2006, 4 pages.

International Search Report and Written Opinion of the International Search Authority for International Application No. PCT/US05/43126 from the International Searching Authority (EPO), mailed on Nov. 22, 2006, 4 pages.

International Search Report and Written Opinion of the International Search Authority for International Application No. PCT/US06/28349 from the International Searching Authority (EPO), mailed on Aug. 13, 2007, 5 pages.

"www.yahoo.com" from Dec. 12, 1998 as archived in the Internet archive (www.archive.org), 2 pages.

"Specification of the Bluetooth System: Profiles", Bluetooth, Part K:1 Generic Access Profile, Dec. 1, 1999, Specification vol. 2, Version 1.0 B, pp. 1-60.

Charny, B., "VoIP Phone Maker Plans a Cell Hybrid", http://news.cnet.com/2100-7352_3-5086177.html, CNET News, Oct. 3, 2003, pp. 1-2.

Chavez, A. et al., "Kasbah: An Agent Marketplace for Buying and Selling Goods", PAAM 96—Proceedings of the First International Conference on the Practical Application of Intelligent Agents and Multi-Agent Technology, Apr. 1996, Practical Application Co., pp. 75-90.

Crowston et al., "The Effects of Linking on Genres of Web Documents", HICSS '99 Proceedings of the Thirty-Second Annual Hawaii International Conference on System Sciences-vol. 2,1999, vol. 2, IEEE Computer Society, Washington, DC, p. 2006 (1-11).

Haartsen, J., "Bluetooth: A New Radio Interface Providing Ubiquitous Connectivity", 2000 IEEE 51st Vehicular Technology Conference Proceedings, 2000, vol. 1, IEEE, Piscataway, NJ, pp. 107-111.

Moldovan et al., "Using WordNet and Lexical Operators to Improve Internet Searches", IEEE Internet Computing, Jan.-Feb. 2000, vol. 4, Issue 1, IEEE Computer Society, Piscataway, NJ, pp. 34-43.

Schneiderman, R., "Bluetooth's Slow Dawn", IEEE Spectrum, Nov. 2000, vol. 37, Issue 11, IEEE Press, Piscataway NJ, pp. 61-65.

SYSTEM AND METHOD FOR TARGETED TUNING OF A SPEECH RECOGNITION SYSTEM

CROSS REFERENCE TO RELATED APPLICATIONS

This application claims priority from and is a continuation of U.S. patent application Ser. No. 12/503,586, filed on Jul. 15, 2009 and entitled "System and Method for Targeted Tuning of a Speech Recognition System," which claims priority from and is a continuation of U.S. patent application Ser. No. 10/917,233 filed on Aug. 12, 2004 and entitled "System and Method for Targeted Tuning of a Speech Recognition System," now issued as U.S. Pat. No. 7,580,837, both of which are incorporated herein by reference in their entireties.

FIELD OF THE DISCLOSURE

The present disclosure relates to a system and method of targeted tuning of a speech recognition system.

BACKGROUND

Many speech solutions, such as speech-enabled applications and speech recognition systems, utilize a computing device to "listen" to a user utterance and to interpret that utterance. Depending upon design considerations, a speech solution may be tasked with accurately recognizing a single user's utterances. For example, a dictation-focused solution may need to be highly accurate and tuned to a given user. In other applications, a system designer may want a speech solution to be speaker-independent and to recognize the speech of different users, provided the users are speaking in the language the application is designed to process and the users are uttering phrases associated with the application.

In practice, a user utterance may be "heard" by a computing device and may be broken into pieces. Individual sounds and/or a collection of individual sounds may be identified and matched to a predefined list of sounds, words, and/or phrases. The complex nature of translating raw audio into discrete pieces and matching the audio to a pre-defined profile often involves a great deal of signal processing and may, in some instances, be performed by a speech recognition (SR) engine executing on a computing system.

While SR engines may be relatively accurate, these engines and other speech solution components often require tuning. In practice, a system's recognition rate at implementation may be unacceptably low. This recognition rate may be improved through tuning. However, conventional approaches to tuning may be costly. Moreover, the effectiveness of conventional tuning approaches is often difficult to quantify and predict.

DETAILED DESCRIPTION

Figure 1:
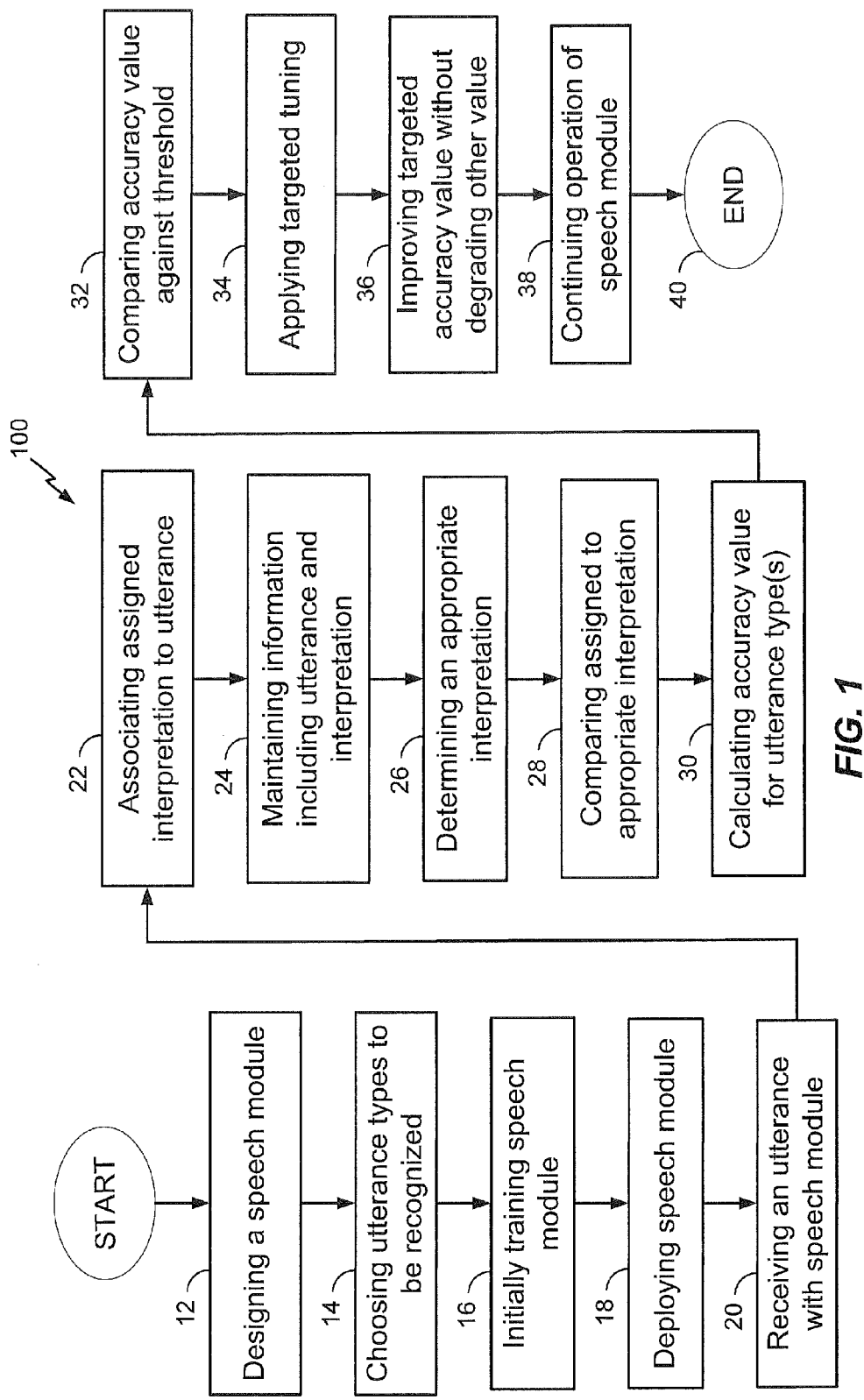
FIG. 1 presents a flow diagram for providing targeted speech solution tuning in accordance with the teachings of the present disclosure.

A system and method of targeted tuning of a speech recognition system are disclosed. In a particular embodiment, a method includes determining a frequency of occurrence of a particular type of utterance method and includes determining whether the frequency of occurrence exceeds a threshold. The method further includes tuning a speech recognition system to improve recognition of the particular type of utterance when the frequency of occurrence of the particular type of utterance exceeds the threshold.

Another particular embodiment discloses a speech recognition system that includes a speech module to assign an utterance type to a received utterance. The speech recognition system includes a targeting engine to compare a frequency of occurrence of the utterance type to a threshold. A tuning engine tunes the speech module to improve recognition of the utterance type when the frequency of occurrence of the utterance type exceeds the threshold.

Another particular embodiment discloses a computer readable storage medium including instructions that, when executed by a processor, cause the processor to tune a speech recognition device when a frequency of an utterance type exceeds a threshold. The computer readable storage medium includes instructions that, when executed by the processor, cause the processor to determine a frequency of occurrence of an utterance type. The computer readable storage medium includes instructions, that when executed by the processor, cause the processor to compare the frequency of occurrence of the utterance type to a threshold. The computer readable storage medium also includes instructions that, when executed by the processor, cause the processor to tune a speech recognition device to recognize the utterance type with improved accuracy when the frequency of occurrence of the utterance type exceeds the threshold.

From a high level, one technique for providing targeted tuning of a speech-enabled system may include deploying a speech recognition module to interpret a plurality of utterance types. The technique may also include accessing information representing a collection of recorded utterances and an indication of how each of the recorded utterances was interpreted by the speech recognition module. The assigned interpretations may be compared to accurate interpretations, and a separate accuracy value may be determined for each of the plurality of utterance types. With some implementations, if the accuracy value for a given type of utterance is too low, a selection of utterances having the given type may be used to tune the speech recognition module.

In effect, a deployed speech recognition system may be tuned to better recognize the specific words and/or phrases that give the system difficulties. Similarly, if a deployed system has an acceptable recognition rate for certain utterances, those utterances may be exempted from additional tuning—helping to protect those utterances that enjoy an acceptable recognition rate from inadvertent recognition rate degradation.

Targeting the tuning efforts on problematic utterances may help reduce system-tuning costs. Moreover, the effectiveness of the targeted tuning approach may prove easier to quantify and/or predict—allowing a system administrator to produce recognizable improvements in the deployed system's overall recognition rate by focusing on specific areas of concern.

FIG. 1 presents a flow diagram for providing targeted speech solution tuning in accordance with the teachings of the present disclosure. A technique 10 of FIG. 1 may begin with designing a speech module as indicated at 12. The process of designing the speech module may include, for example, making decisions as to whether the system to be deployed will be speaker-dependent, speaker-independent, capable of recognizing words and/or phrases, designed to recognize a broad range of utterance types, a limited range of utterance types, etc.

In one embodiment, a speech recognition system to be deployed may be designed to be speaker-independent and to recognize utterance types that include several different action requests. Depending upon implementation detail, an action request may be a single word, a phrase, a sentence, etc. In one embodiment, an action request may be an Action-Object request, that may include a statement indicating an action to be taken and an object related to that action. For example, a bill-paying request includes a "Pay" action coupled with a "Bill" object. Other Action-Object requests may include, for example, inquire balance, change service, acquire service, cancel service, inquire bill, inquire account, schedule payment, and reconnect service.

At 14, utterance types to be recognized may be selected, and the speech module may be initially trained at 16. In a speaker-independent system, thousands of speech samples from many people may be considered in an effort to develop a profile for expected utterances. The profile may represent, for example, a derived "average" caller profile. The samples may, for example, be collected from actual deployed speech applications and/or purchased as pre-recorded samples of people uttering the expected phrases in a phonetically balanced American English or other appropriate language/dialect.

At 18, the speech module may be deployed into a live environment. The environment may be, for example, a call center application. At 20, the speech module may receive an utterance. An incoming signal may represent the utterance and may be digitized for further manipulation. In practice, the speech module may digitize the incoming speech signal and calculate utterance parameters.

At 22, the system may compare the utterance parameters to a "library" of known and/or expected phrases and attempt to find the best match—associating an assigned interpretation to the utterance. Depending upon earlier design considerations, the system may, for example, perform "whole word" recognition and/or sub-word recognition like "phonetic recognition." In some cases, the system may or may not be capable of finding a match and/or assigning an interpretation. If an interpretation is assigned, the assigned interpretation may or may not be accurate.

At 24, information associated with a call may be maintained. The information may include, for example, a recording of a received utterance, an indication of whether an interpretation was made, an indication of what interpretation was made, an utterance receipt time, an indication of whether the assigned interpretation was accurate, etc. In practice, an utterance recording may be saved as a discrete audio file, having a format such as a WAV format, an MP3 format, an AU format, or a MIDI format.

At 26, the deployed system, the speech module, and/or some other system or individual may consider a previously received utterance and independently assign an "appropriate" interpretation to the utterance. The appropriate interpretation may be compared against the assigned interpretation at 28 to determine how well the speech module is operating.

In some embodiments, an independent accuracy value may be calculated for at least one utterance type at 30. The independent accuracy value may effectively indicate how well a speech module is "recognizing" a given utterance type. The accuracy value may be based on a single criteria or a combination of criteria such as recognition rates, hits, misses, etc., for a specific utterance type. However determined, it may become apparent that a speech-enabled system more accurately responds to a first type of utterance and has a more difficult time with a second type of utterance. For example, a system may recognize an action like "pay bill" with an acceptable level of accuracy and may not recognize an action like "transfer to agent" with an acceptable level of accuracy. As such, an administrator and/or tuning application may elect to apply targeted tuning to the speech system to improve recognition of the second type of utterance.

One example methodology for calculating an accuracy value could include, for example, calculating a hit rate value and a false alarm value for a given utterance type. In practice, the accuracy value may include or represent one or more of these and/or other values. The methodology may also include determining a frequency value for the given utterance type. An administrator may want to know, for example, how "important" an utterance type is. If an utterance type represents less than one percent of the received utterances, an administrator may determine that the utterance type does not warrant additional tuning. The importance threshold may be a predefined value and/or importance threshold level decisions may be made on a more ad hoc basis.

Similarly, an administrator may set a threshold value for an accuracy value, a hit rate value, a false alarm value, etc. Again, the threshold values may be pre-set or adjusted in an ad hoc manner. As mentioned above, an assigned accuracy value may be compared at 32 against a threshold value to determine if a system needs tuning. In accordance with one aspect of the present disclosure, a system administrator and/or a tuner may determine that a specific utterance type recognition rate is too low and elect to use a tuning application at 34 to improve the system recognition rate. Operationally, the tuning application may initiate the accessing of interpretive information that represents a received utterance and an assigned interpretation. For example, a given system may maintain a historical record of its own performance. The record may include, for example, recordings of received utterances and system assigned interpretations for each of the received utterances.

A given tuning application may access an appropriate interpretation for each of the received utterances. The appropriate interpretation may represent a more accurate interpretation of an utterance and may be generated by the tuning application and/or by an entity separate from the tuning application. The application may then begin targeted tuning, which may involve, for example, feeding a collection of one type of utterance into a learning module. In one embodiment, the process of feeding the learning module may include playing one or more files that represent recordings of an utterance type while also inputting an appropriate interpretation for the recordings.

At 36, improving recognition of one type of utterance may occur without degrading recognition of other types of utterances. This objective may be facilitated, for example, by attempting to avoid the feeding of non-targeted utterance types into the learning module. At 38, operation of the speech module may be continued, and a future date may be selected for calculating the effectiveness of the targeted tuning. The technique 10 may then progress to stop at 40.

The various acts of the technique 10 may be amended, altered, added to, removed, looped, etc. without departing from the teachings. Moreover, a single entity and/or a combination of entities may perform acts of the technique 10. For example, some of the acts may be performed in connection with an automated call router, a voice activated services platform, a call center, and/or some other operational environment.

Figure 2:
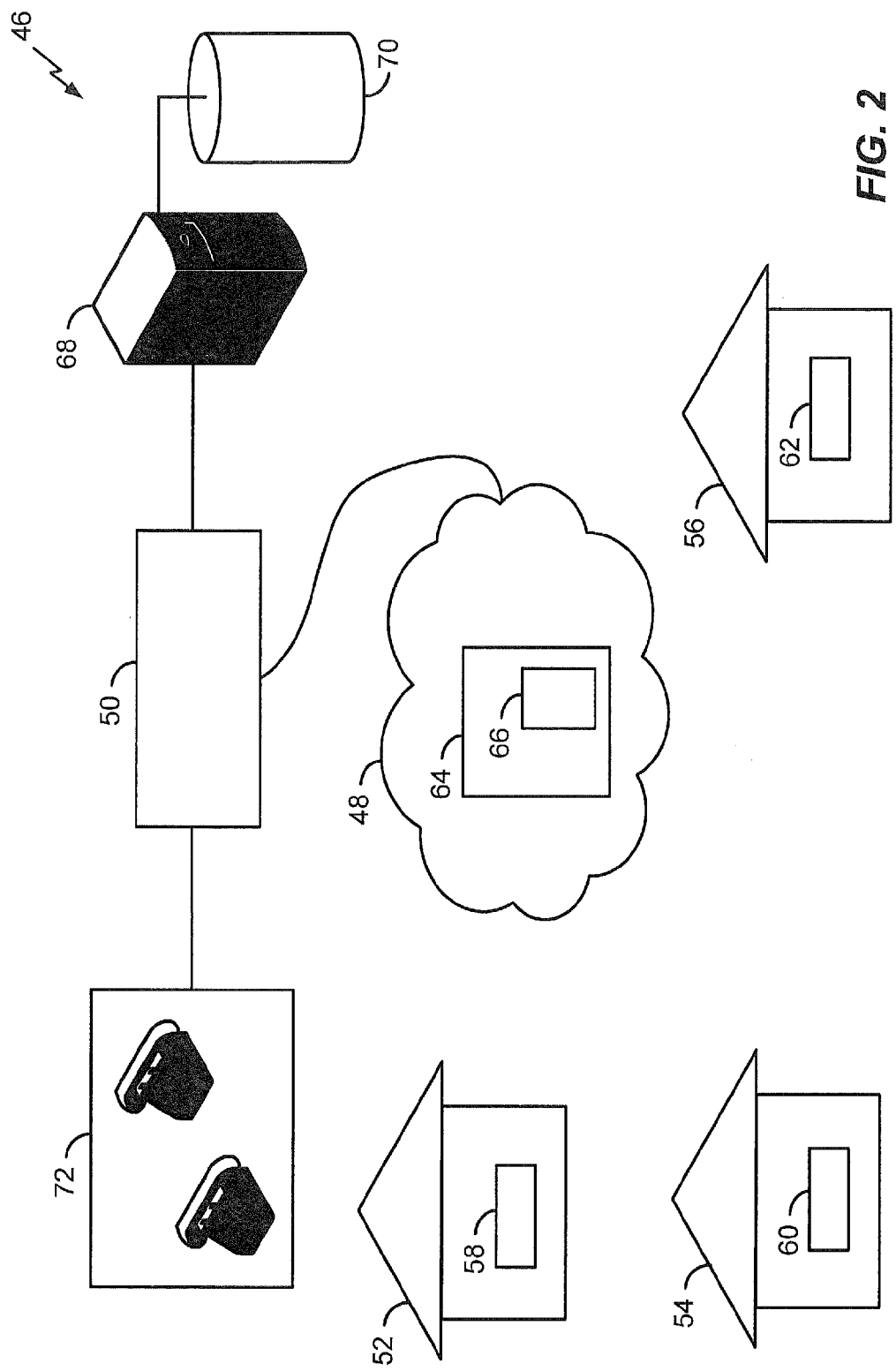
FIG. 2 shows one embodiment of a speech-enabled system that incorporates teachings of the present disclosure.

FIG. 2 shows one embodiment of a speech-enabled system 46 that incorporates teachings of the present disclosure. In practice, a communication network 48, which may be a Public Switched Telephone Network (PSTN), a cable network, an Internet, an intranet, an extranet, or some other network capable of carrying voice traffic, may be communicatively coupled to a speech system 50. A caller from a location, such as location 52, 54, and/or 56, may place a call to the speech system 50 in an effort to receive, for example, information and/or some form of customer service.

A caller may use a communication device, such as device 58, 60, or 62 to link to a node 64 of network 48. The devices 58, 60, and 62 may be, for example, Plain Old Telephone Service (POTS) telephones, voice over IP telephones, computers, cellular telephones, wireless devices, and/or some other device capable of initiating the communication of information via a network.

Depending upon the architecture of the network 48, incoming communications may be multiplexed, converted from a circuit switched communication to a packet switched communication, converted from text to speech, and/or other types of call modifications at an interface 66 before the communication is passed on to the system 50.

As depicted, the system 50 may include a computing platform 68 and a repository 70 storing a sample of utterances received by the system 50. In practice, the platform 68 may perform speech recognition functions. The platform 68 may receive a verbal communication via the network 48 and process the communication in an effort to properly interpret the communication. The communication itself, as well as an assigned interpretation may be captured and saved in the repository 70. Additional information may also be stored in the repository 70. Additional information may be call-related and may include information such as call time, call duration, calling party number, caller language, etc.

In some cases, the platform 68 may assist in interpreting an utterance as a request to speak with an agent. In such a situation, the platform 68 may direct a component of the system 50 to route a caller to a help desk operator at a call center 72. The system 50 may take several forms. For example, the system 50 may be an integrated solution—including multiple features and capabilities in a single device, having a common housing. The system 50 may also take on a more decentralized architecture—where devices and functions are located remote from one another. An example of a relatively centralized system is depicted in FIG. 3.

Figure 3:
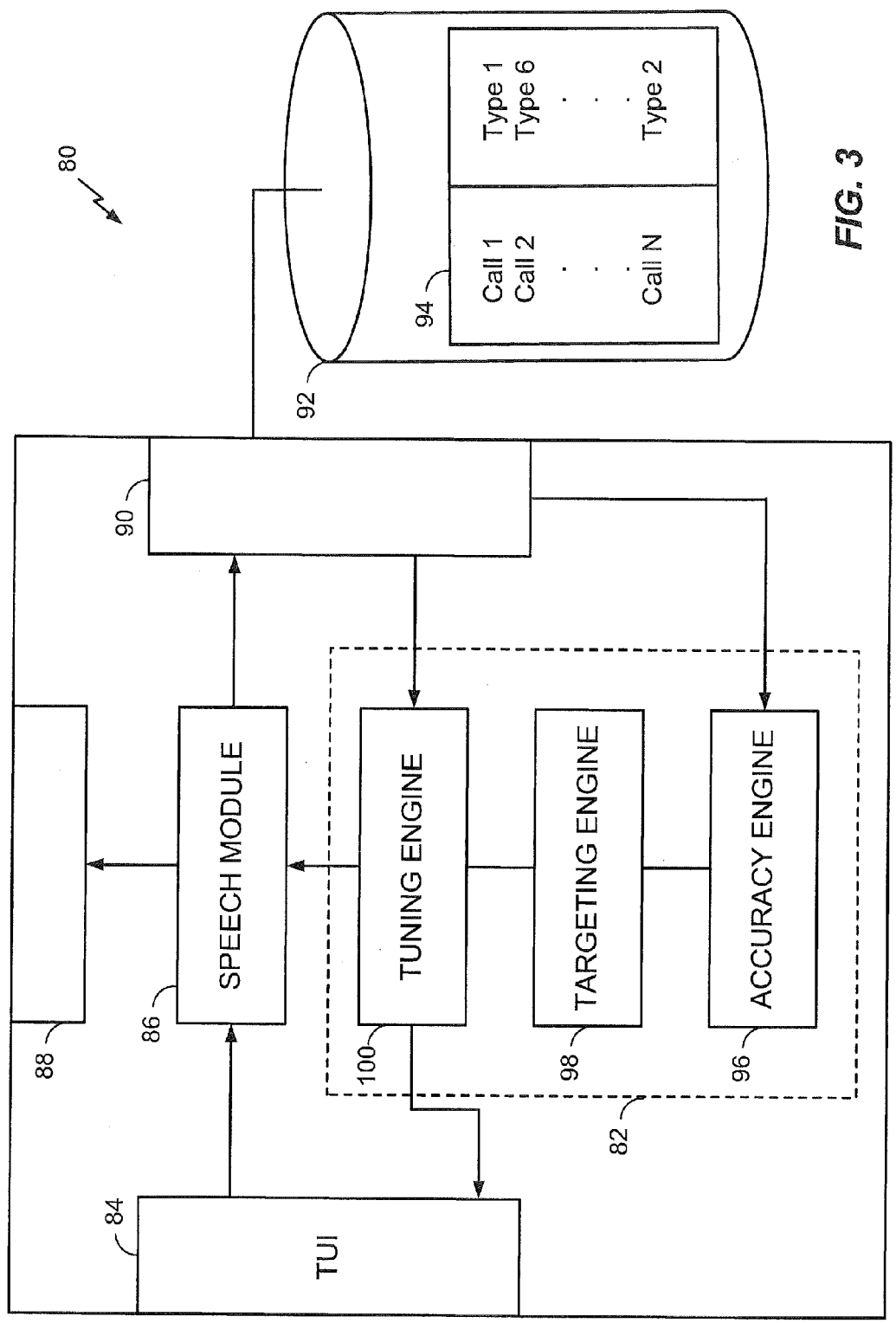
FIG. 3 presents a high-level block diagram of a speech-enabled system incorporating a training tool in accordance with the teachings of the present disclosure.

FIG. 3 presents a high-level block diagram of a speech-enabled system 80 incorporating a training tool subsystem 82 in accordance with the teachings of the present disclosure. In operation of the speech-enabled system 80, an utterance may be received via a Telephone User Interface (TUI) 84. The utterance may be passed to a speech module 86, that may act as a speech recognition engine and assign an utterance type to the utterance. The speech module 86 may also include logic that makes a call routing and/or a call response decision based at least partially upon the assigned utterance type. Effectuating the decision of the speech module 86 may be facilitated in some cases by an interface 88.

In practice, a recording of the utterance and an assigned utterance type for the call may be communicated via an interface 90 to a repository 92. The recording, assigned utterance type, and other call related information may be stored in a table 94 or other structured and searchable information store.

In some embodiments, an accuracy engine 96 may periodically query the repository 92 for information maintained in the table 94. The accuracy engine 96 may use retrieved information to determine if an assigned utterance type for a given captured utterance represents an accurate interpretation of the given captured utterance. Information representing the accuracy engine 96's analysis may be transferred to a targeting engine 98. The targeting engine 98 may use the analysis to help determine an accuracy level of the system 80 in identifying a first type of utterance and another accuracy level of the system 80 in identifying a second type of utterance. The targeting engine 98 may also include logic that compares a calculated accuracy value for one or more utterance types against a threshold or acceptable accuracy level. If an utterance type suffers from an unacceptably low accuracy value, the targeting engine 98 may output an indicator informing the subsystem 82 of a need to train the system 80 on that particular utterance type.

In some embodiments, a system, such as the system 80 may include an integrated tuning engine 100. The tuning engine 100 may recognize the indicator output by the targeting engine 98, and begin tuning the system 80 to better recognize the utterance type that is causing the system 80 difficulties. In practice, the tuning engine 100 may feed the speech module 86 with a collection of utterances having a first type if the first type accuracy level is too low. The collection of utterances may, in some embodiments, include actual captured utterances stored in the repository 92. In some embodiments, the tuning engine 100 may take the necessary steps to avoid feeding other utterance types to the speech module 86.

Though the various engines and components of the system 80 and the subsystem 82 are depicted as independent blocks, many of the features could be combined and/or further separated. In some embodiments, one or more of the depicted components may be embodied in software that executes on a computing platform. For example, a computer-readable medium may include a set of instructions embodying the accuracy engine, the targeting engine, and the tuning engine. Moreover, one or more aspects of the system 80 may be associated with an automated call router, a voice activated services platform, a call center, and/or some other operational computing system that interacts with a caller.

The above-disclosed subject matter is to be considered illustrative, and not restrictive, and the appended claims are intended to cover all such modifications, enhancements, and other embodiments that fall within the scope of the present invention.

What is claimed is:

1. A method comprising:
   detecting that a frequency of occurrence of a particular type of utterance satisfies a threshold; and
   in response to detecting that the frequency satisfies the threshold, tuning a speech recognition system with respect to the particular type of utterance.

2. The method of claim 1, further comprising determining the frequency based on a group of received utterances.

3. The method of claim 1, wherein the threshold is determined by a system administrator.

4. The method of claim 1, wherein the threshold is user programmable.

5. The method of claim 1, wherein tuning the speech recognition system includes inputting a collection of utterances of the particular type of utterance into a learning module of the speech recognition system.

6. The method of claim 5, wherein inputting the collection of utterances includes playing one or more files that represent recordings of the particular type of utterance.

7. The method of claim 1, wherein system recognition of the particular type of utterance is dependent on a particular speaker.

8. The method of claim 1, wherein system recognition of the particular type of utterance is independent of a particular speaker.

9. The method of claim 1, wherein the utterance is one of a single word spoken by a speaker, a phrase spoken by the speaker, or a sentence spoken by the speaker.

10. The method of claim 1, wherein the utterance corresponds to a request that indicates an action to be taken on an object.

11. The method of claim 10, wherein the request is one of a request to pay a bill, a request for an account balance, a request to change services, a request to acquire services, a request to cancel services, a request to schedule a payment, or a request to reconnect services.

12. A speech recognition system, comprising:
   a processor; and
   a tuning engine comprising instructions that are executable by the processor to tune a speech module with respect to a particular type of utterance in response to the processor determining that a frequency of occurrence of the particular type of utterance satisfies a threshold.

13. The speech recognition system of claim 12, further comprising a targeting engine including instructions that are executable by the processor to:
   determine the frequency of occurrence of the particular type of utterance; and
   determine that the frequency of occurrence of the particular type of utterance satisfies the threshold.

14. The speech recognition system of claim 12, wherein the threshold is from a table of thresholds, the thresholds corresponding to a plurality of utterance types.

15. The speech recognition system of claim 12, further comprising an accuracy engine including instructions executable by the processor to determine an accuracy of recognition of the particular type of utterance.

16. The speech recognition system of claim 15, wherein the accuracy of recognition of the particular type of utterance is compared to an accuracy threshold.

17. The speech recognition system of claim 16, wherein the tuning engine is responsive to the accuracy engine.

18. The speech recognition system of claim 15, wherein the frequency of occurrence of the particular type of utterance depends on the accuracy of recognition of the particular type of utterance.

19. A computer readable storage device comprising instructions that, when executed by a processor, cause the processor to perform operations comprising:
   detecting that a frequency of occurrence of a particular type of utterance satisfies a threshold; and
   in response to detecting that the frequency satisfies the threshold, tuning a speech recognition system with respect to the particular type of utterance.

20. The computer readable storage device of claim 19, wherein the operations further include:
   calculating a hit rate associated with the particular type of utterance;
   calculating a false alarm value associated with the particular type of utterance; and
   maintaining a record of performance of the speech recognition system.

* * * * *